United States Patent [19]

Su et al.

[11] Patent Number: 5,238,971

[45] Date of Patent: Aug. 24, 1993

[54] POLYOXYALKYLENE GLYCOLS CONTAINING IMIDAZOLIDONES

[75] Inventors: Wei-Yang Su; Michael Cuscurida, both of Austin, Tex.

[73] Assignee: Texaco Chemical Company, White Plains, N.Y.

[21] Appl. No.: 984,760

[22] Filed: Dec. 3, 1992

[51] Int. Cl.$^5$ ............................................. C08G 18/00
[52] U.S. Cl. .................................. 521/116; 521/129; 521/164; 521/174
[58] Field of Search ............... 521/116, 129, 164, 174

[56] References Cited

U.S. PATENT DOCUMENTS

| | | | |
|---|---|---|---|
| 3,267,050 | 8/1966 | Kuryla et al. | 521/163 |
| 3,905,924 | 9/1975 | Prokai | 521/111 |
| 3,905,925 | 9/1975 | Vervloet | 521/160 |
| 3,993,606 | 11/1976 | Von Bonin et al. | 521/111 |
| 4,383,100 | 5/1983 | Pechhold | 521/158 |

*Primary Examiner*—Morton Foelak
*Attorney, Agent, or Firm*—Jack H. Park; Kenneth R. Priem

[57] ABSTRACT

This invention is concerned with polyoxyalkylene glycols prepared by alkoxylating a hydroxyalkyl-2-imidazolidone and to a process for preparing flexible polyurethane foams by reacting an organic isocyanate with an admixture of a polyether polyol and an alkoxylated hydroxyalkyl-2-imidazolidone in the presence of a urethane catalyst and a blowing agent.

8 Claims, No Drawings

POLYOXYALKYLENE GLYCOLS CONTAINING IMIDAZOLIDONES

This application is related to U.S. patent application Ser. No. 07/928,582 for Polyetherdiamines Containing Imidazolidones of Su et al., filed Aug. 13, 1992 pending.

BACKGROUND OF THE INVENTION

1. Field of the Invention

This invention relates to polyoxyalkylene glycols containing imidazolidones. More particularly, this invention relates to polyoxyalkylene glycols prepared by alkoxylating a hydroxyalkyl-2-imidazolidone with an alkylene oxide.

In another aspect this invention relates to flexible polyurethane foams prepared by a process comprising reacting an organic polyisocyanate and an admixture of a polyether polyol and the alkoxylated product of a hydroxyalkyl-2-imidazolidone in the presence of a urethane catalyst and a blowing agent. The flexible polyurethane foams of this invention which contain an internal cyclic urea group (imidazolidone) exhibit improved tear and elongation properties over polyurethane foams prepared with prior art polyols.

2. Prior Art

U.S. Pat. No. 3,993,606 to von Bonin et al. teaches a process for the production of a foam which readily separates from the mold where the foamable reaction mixture contains an organic polyisocyanate, a polyether having a molecular weight of about 62 to about 10,000, a catalyst, a blowing agent such as water and a mold release agent such as a salt of a polysiloxane containing an amino group.

U.S. Pat. No. 3,267,050 to Kuryla et al. teaches the preparation of foamed reaction products prepared from an organic polyisocyanate and a polyol, one or more polyoxyalkylene amines, a blowing agent such as water and a catalyst.

U.S. Pat. No. 3,905,924 to Prokai discloses a process for producing high resilience polyether urethane foam by reaction of a polyisocyanate, a blowing agent such as water, methylene chloride, etc., a catalyst such as stannous octoate, dibutyl tin dilaurate, nickel acetylacetonates, etc. and a cyanoalkyl modified siloxane fluid.

U.S. Pat. No. 4,383,100 to Pechold teaches a process for preparing polyurethanes which are the reaction products of (1) a diol made by coupling segments of copolymers of tetrahydrofuran and an alkylene oxide with formaldehyde, (2) an Organic polyisocyanate, (3) a chain extender such as piperazine, ethylenediamine, hydrazine, etc., and, optionally, a foaming agent such as a fluorocarbon or water.

U.S. Pat. No. 3,905,925 to Vervloet teaches a process for preparing solid polyurethane products or microcellular foam polyurethane products by reacting together a quasi-isocyanate prepolymer and a quasi-hydroxyl prepolymer in the presence of a catalyst. In preparing foam products by this process a blowing agent such as water is added to the reaction mixture.

SUMMARY OF THE INVENTION

The polyoxyalkylene glycols of this invention are prepared by alkoxylating a hydroxyalkyl-2-imidazolidone initiator by methods well known in the art. Suitable alkoxylating agents include alkylene oxides having 2 to 18 carbon atoms.

The flexible polyurethane foams of this invention comprise the reaction product of an organic polyisocyanate, a urethane catalyst, a blowing agent and a polyol admixture comprising a polyether polyol (molecular weight 2000–8000) and about 5 to about 40 weight percent based on the weight of the polyether polyol of an alkoxylated product of a hydroxyalkyl-2-imidazolidone having a molecular weight of 400–5000.

The alkoxylated products of hydroxyalkyl-2-imidazolidone which are polyoxyalkylene glycols and which are useful in preparing the polyurethane foams of this invention include compounds of the formula:

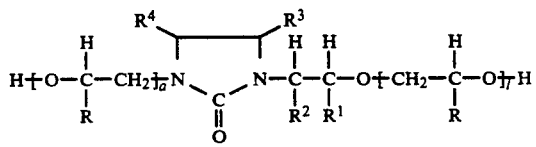

wherein R is H or an alkyl group containing 1 to 16 carbons, $R^1$, $R^2$, $R^3$ and $R^4$ are selected from the group consisting of hydrogen and alkyl radicals having from about 1 to 4 carbon atoms and $a+b=n$, a number of from about 4 to about 80. Preferably in the described polyoxyalkylene glycols employed in preparing flexible polyurethane foams $R^1$, $R^2$, $R^3$ and $R^4$ are hydrogen.

The polyoxyalkylene glycols, i.e., the compounds prepared by alkoxylation of the hydroxyalkyl-2-imidazolidone initiators are different from prior art polyols in that they contain an internal cyclic urea group, have a narrower molecular weight distribution and give improved properties in flexible polyurethane foam.

In another aspect this invention relates to a polyol composition suitable for preparing polyurethanes which comprises an admixture of a polyether polyol such as a polyoxypropylene glycol, an alkylene oxide adduct of glycerol or trimethylolpropane, etc. and about 5 to about 40 weight percent based on the weight of the polyether polyol of a polyoxyalkylene glycol of the formula:

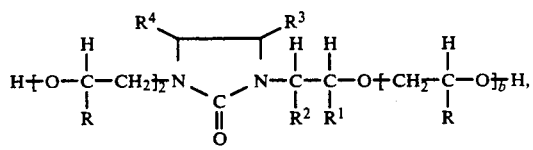

wherein R is H or an alkyl group containing 1 to 16 carbons, $R^1$, $R^2$, $R^3$ and $R^4$ are selected from the group consisting of hydrogen and lower alkyl radicals having from about 1 to 4 carbon atoms and $a+b=n$, a number of from about 4 to about 80.

DESCRIPTION OF THE PREFERRED EMBODIMENTS

The polyoxyalkylene glycols containing imidazolidones employed in the process for making the polyurethane foams of this invention can be prepared by methods well known in the art and as set out in Examples 1–7.

Preparation of alkoxylated hydroxy-2-imidazolidone materials can be carried out by reacting a 1-2′-hydroxyalkyl-2-imidazolidone in the presence of a suitable catalyst with an alkylene oxide of the formula:

where R is hydrogen or an alkyl group containing 1 to 16 carbon atoms. Preferred alkylene oxides include ethylene oxide, propylene oxide, 1,2-butylene oxide, 2,3-butylene oxide and mixtures thereof. Generally, the hydroxyl number of the suitable alkoxylated hydroxy-2-imidazolidone compound will range from about 20 to about 280.

Suitable catalysts for the alkoxylation reaction include alkali metals, their hydroxides, oxides and hydrides, etc. and basic amines such as trimethylamine, triethylamine, etc. Sodium, potassium, calcium and especially sodium and potassium hydroxide are useful alkoxylation catalysts.

1-2'-hydroxyalkyl-2-imidazolidone (HEIMD) initiators useful in forming alkoxylated hydroxyalkyl-2-imidazolidone compounds suitable for use in the polyurethane foam process of this invention include, for example, the following:

1-2'-hydroxyethyl-2-imidazolidone,
1-2'-hydroxypropyl-2-imidazolidone,
1-2'-hydroxyethyl-4-methyl-2-imidazolidone,
1-2'-hydroxyethyl-5-methyl-2-imidazolidone,
1-2'-hydroxyethyl-4,5-dimethyl-2-imidazolidone,
1-2'-hydroxypropyl-4,5-dimethyl-2-imidazolidone, and
1-2'-hydroxy-1'-methylpropyl-2-imidazolidone.

Polyether polyols useful in forming the admixtures with the polyoxyalkylene glycols of this invention include polyols having a hydroxyl number between about 20 to about 60. The polyether polyol is generally an alkylene oxide adduct of a polyhydric glycol such as ethylene glycol, propylene glycol, glycerol, trimethylolpropane, sorbitol, sucrose, methylglucoside, 1,2,6-hexanetriol, erythritol, pentaerythritol, etc. with a functionality of from about 2 to about 8.

The alkylene oxide employed to prepare the polyether polyols may suitably be ethylene oxide, propylene oxide, or 1,2-butylene oxide or a mixture of some or all of these. The polyol will preferably have a molecular weight within the range of from about 2,000 to about 10,000 and more preferably, from about 2,000 to about 8,000. The alkylene oxide is preferably propylene oxide or a mixture of propylene oxide and ethylene oxide.

Polyisocyanates useful for making the polyurethane foams may be chosen from the following polyisocyanates, 2,4-toluene diisocyanate, 2,6-toluene diisocyanate, dianisidine diisocyanate, bitolylene diisocyanate, naphthalene-1,4-diisocyanate, xylyene-1,4-diisocyanate, xylylene-1,3-diisocyanate, bis (4-isocyanatophenyl)methane, bis(3-methyl-4-isocyanatophenyl)methane, and 4,4'-diphenylpropane diisocyanate and mixtures thereof.

Greatly preferred aromatic polyisocyanates used in the practice of the invention are 2,4- and 2,6-toluene diisocyanates and methylene-bridged polyphenyl polyisocyanate mixtures which have a functionality of from about 2 to about 4. These latter isocyanate compounds are generally produced by the phosgenation of corresponding methylene-bridged polyphenyl polyamines, which are conventionally produced by the reaction of formaldehyde and primary aromatic amines, such as aniline, in the presence of hydrochloric acid and/or other acidic catalysts. Known processes for preparing polyamines and corresponding methylene-bridged polyphenol polyisocyanates therefrom are described in the literature and in many patents; for example, U.S. Pat. Nos. 2,683,730; 2,950,263; 3,012,008; 3,344,162 and 3,362,979.

Most preferred methylene-bridged polyphenyl polyisocyanate mixtures used here contain about 20 to about 100 weight percent methylene diphenylidiisocyanate isomers, with the remainder being polymethylene polyphenyl polyisocyanates having higher functionalities and higher molecular weights. Typical of these are polyphenyl polyisocyanate mixtures containing about 20 to 100 weight percent methylene diphenyldiisocyanate isomers, of which 20 to about 95 weight percent thereof is the 4,4'-isomer with the remainder being polymethylene polyphenol polyisocyanates of higher molecular weight and functionality that have an average functionality of from about 2.1 to about 3.5. These isocyanate mixtures are known, commercially available materials and can be prepared by the process described in U.S. Pat. No. 3,362,979, issued Jan. 9, 1968 to Floyd E. Bentley.

Catalysts have long been considered necessary for the formation of polyurethanes. The catalyst is employed to promote at least two, and sometimes three major reactions that must proceed simultaneously and competitively at balanced rates during the process in order to provide polyurethanes with the desired physical characteristics. One reaction is a chain extending isocyanate hydroxyl reaction by which the hydroxyl-containing molecule is reacted with the isocyanate-containing molecule to form a urethane. This increases the viscosity of the mixture and provides a polyurethane containing secondary nitrogen atoms in the urethane groups. A second reaction is a cross-linking isocyanate urethane reaction by which an isocyanate-containing molecule reacts with a urethane group containing a secondary nitrogen atom. The third reaction which may be involved is an isocyanate-water reaction by which an isocyanate-terminated molecule is extended and by which carbon dioxide is generated to blow or assist in the blowing of foam. This third reaction is not essential if an extraneous blowing agent, such as a halogenated, normally liquid hydrocarbon, carbon dioxide, etc. is employed, but is essential if all or even part of the gas for foam generation is to be generated by this in situ reaction (e.g., in the preparation of "one-shot" flexible polyurethane foams). Such catalysts may include one or more of the following:

(a) Tertiary amines such as trimethylamine, triethylamine, N-methylmorpholine, N-ethylmorpholine, N,N-dimethylbenzylamine, N,N-dimethylethanolamine, N,N,N'N'-tetramethyl-1,3-butanediamine, N,N-dimethylpiperazine, 1,4-diazabicyclo(2.2.2)octane and the like;

(b) Tertiary phosphines such as trialkylphosphines, dialkylbenzylphosphines, and the like;

(c) Strong bases such as alkali and alkaline earth metal carboxylates. In other words, salts of organic acids with a variety of metals such as alkali metals, alkaline earth metals, Al, Sn, Pb, Mn, Co, Ni, and Cu, including, for example, sodium acetate, stannous octoate, stannous oleate, lead octoate, metallic driers such as manganese and cobalt naphthenate, and the like;

(d) Acidic metal salts of strong acids such as ferric chloride, stannic chloride, stannous chloride, antimony trichloride, bismuth nitrate and chloride, and the like;

(e) Chelates of various metals such as those which can be obtained from acetylacetone, benzoylacetone, trifluoracetyl acetone, ethyl acetoacetate, salicylaldehyde, cyclopentanone-1-carboxylate, acetylacetonelamine, bisacetylacetonealkylenediamines, salicycladehydeimine, and the like, with various metals such as Be, Mg, Zn, Od, Pd, Ti, Zr, Sn, As, Bi, Cr, Mo, Mn, Fe, Co, and Ni;

(f) Alcoholates and phenolates of various metals such as Ti(OR)$_4$', Sn(OR)$_4$', Al(OR)$_3$', and the like, wherein R is alkyl or aryl, and the reaction products of alcoholates with carboxylic acids, beta-diketones, and 2-(N,N-dialkylamino)alkanols;

(g) Organometallic derivatives of tetravalent tin, trivalent and pentavalent As, Sb, and Bi, and metal carbonyls of iron and cobalt.

Of course combinations of any of the above polyurethane catalysts may be employed. Usually the amount of catalyst employed ranges from about 0.01 to about 5.0 parts by weight percent based on 100 parts by weight of the polyol. More often the amount of catalyst used is 0.2 to 2.0 parts by weight.

In preparing the polyurethane foams of this invention foaming is carried out in the presence of water and optionally, additional organic blowing agents. The water is normally used in amounts of 0.5 to 6.0 parts by weight, preferably 1.0 to 4.0 parts by weight based on 100 parts by weight of the polyether polyol and the alkoxylated hydroxy-2-imidazolidone present. The organic blowing agents optionally used along with the water are known in the art and are, for example, monofluorotrichloromethane, difluorodichloromethane, methylene dichloride and others generally known in the art.

Additives to regulate the cell size and the cell structure, for example, silicones or siloxanes, usually silicone-glycol copolymers may also be added to the foaming mixture. Fillers, flame retarding additives, dyes or plasticizers of known types may also be used. These and other additives are well known to those skilled in the art.

The following examples, which illustrate the invention, are not to be construed as limiting the invention in any way.

PREPARATION OF ALKYLENE OXIDE ADDUCTS OF 1-2'-HYDROXYALKYL-2-IMIDAZOLIDONE

EXAMPLE 1

PREPARATION OF AN ETHYLENE OXIDE/PROPYLENE OXIDE ADDUCT OF 1-2'-HYDROXYETHYL-2-IMIDAZOLIDONE (HEIMD)

The HEIMD (4.0 lb.) and 45% potassium hydroxide (40.3 g) were charged into a five-gallon reactor. The reactor was then purged with prepurified nitrogen. Maintaining a nitrogen purge the reactor was heated to 110° C. and the initiator dried to a water content of less than 0.15 weight % using both vacuum and nitrogen stripping. Ethylene oxide (5.4 lb.) was then reacted at 110°–115° C. at 50 psig over a 1.0 hour period. The reaction mixture was then digested 0.75 hour to an equilibrium pressure. Propylene oxide (3.6 lb.) was then reacted at 110°–115° C. at 50 psig over a 0.5 hour period. After digestion to an equilibrium pressure, the alkaline product was cooled to 95° C. and neutralized by stirring two hours with 145 g. Magnesol 30/40 adsorbent added as an aqueous slurry. The neutralized adduct product was then vacuum stripped to a minimum pressure, nitrogen stripped, and filtered. Properties of the finished polyoxyalkylene glycol were as follows:

| Properties | Sample No. 6855-79 |
|---|---|
| Hydroxyl no., mg KOH/g | 245 |
| Water, wt. % | 0.05 |
| pH in 10:6 isopropanol-water | 9.4 |
| Color, Pt—Co | 125 |
| Sodium, ppm | 2.9 |
| Potassium, ppm | <1 |
| Viscosity, °F., cs | |
| 77 | 453 |
| 100 | 186 |

EXAMPLES 2–7

PREPARATION OF ALKYLENE OXIDE ADDUCTS OF HEIMD

In this example a number of additional alkylene oxide adducts of HEIMD were prepared in the same manner as described in Example 1. Details relating to the preparation of the adducts of Examples 2–7 are set out in Table 1 which follows:

TABLE 1

| Alkylene Oxide Adducts of 1-2'-Hydroxyethyl-2-Imidazolidone (HEIMD) | | | | | | |
|---|---|---|---|---|---|---|
| Example No. | 2 (6910-13) | 3 (6855-80) | 4 (6855-84) | 5 (6915-56) | 6 (6910-62) | 7 (6915-87) |
| Charge | | | | | | |
| HEIMD, lb. | 4 | 4 | 4 | 8 | 15 | 18$^c$ |
| Potassium hydroxide, g$^a$ | 27.2 | 18.1 | 18.1 | 36 | 43.2 | 157 |
| Ethylene oxide, lb | — | 5.4 | 13.5 | — | — | — |
| Propylene oxide, lb | 19.1 | 3.6 | 5.4 | 17.8 | 16.7 | 72 |
| Magnesol 30/40, g$^b$ | 218 | 181 | 144 | 290 | 350 | 1225 |
| Reaction Details | | | | | | |
| Oxide addition time, hr | 3.5 | 3.1 | 2.1 | 4.5 | 0.75 | 10.75 |
| Temperature, °C. | 110–115 | 110–115 | 110–115 | 110–120 | 110–115 | 110–115 |
| Pressure, psig, max | 50 | 50 | 50 | 38 | 58 | 50 |
| Properties | | | | | | |
| Hydroxyl no., mg KOH/g | 150 | 245 | 142.8 | 271 | 414.7 | 58.4 |

TABLE 1-continued

| Alkylene Oxide Adducts of 1-2'-Hydroxyethyl-2-Imidazolidone (HEIMD) | | | | | | |
|---|---|---|---|---|---|---|
| Water, wt % | 0.04 | 0.05 | 0.033 | 0.06 | 0.08 | 0.04 |
| pH in 10:6 isopropanol-water | 8.4 | 9.4 | 8.8 | 8.9 | 10.6 | 9.4 |
| Color, Pt—Co | 125 | 125 | 175 | 250 | 75 | 125 |
| Sodium, ppm | 0.5 | 2.9 | 0.7 | 1.4 | 3.0 | 0.2 |
| Potassium, ppm | 1.1 | 1.0 | 2.6 | 1.7 | 4.8 | 4.7 |
| Viscosity, °F., cs | | | | | | |
| 77 | 441 | 453 | 320 | 867 | 873 | 513 |
| 100 | 184 | 186 | 76.2 | 311 | 524 | 242 |

[a] Added as 45% aquesou solution; dried to water content of less than 0.1% prior to oxide addition.
[b] Added as aqueous slurry.
[c] 400 mm PO adduct of HEIMD.

The 2000 molecular weight propylene oxide adduct of HEIMD prepared in Example 7 had a polydispersity of 1.12 as compared to 1.27 for a propylene glycol 2000. Polydispersity is an indication of the molecular weight distribution of the polyol and is defined as the ratio of the weight average molecular weight ($\overline{M}w$) to the number average molecular weight ($\overline{M}n$), i.e., $$\frac{\overline{M}w}{\overline{M}n}.$$

PREPARATION OF FLEXIBLE POLYURETHANE FOAM PRODUCTS

EXAMPLES 8-12

PREPARATION OF FLEXIBLE POLYURETHANE FOAMS USING HEIMD-BASED POLYOLS

These examples show the use of the 58.4 hydroxyl no. propylene oxide adduct of Example 7 (6915-87) in the preparation of flexible urethane foam. It further shows that flexible foams made from the HEIMD-based polyols, when incorporated into flexible foam formulations, produced hand-mixed foams with improved tear and elongation properties as compared to those made with a 2000 m.w. polypropylene glycol (PPG-2000).

Formulations, details of preparation, and properties of these foams are shown in Table 2 below:

TABLE 2

| Example No. | 8 | 9 | 10 | 11 | 12 |
|---|---|---|---|---|---|
| Sample No. | (6869-33A) | (6869-33B) | (6869-33C) | (6869-33D) | (6869-33E) |
| Formulation, pbw | | | | | |
| Thanol ® F-3020 polyol[a] | 100 | 90 | 75 | 90 | 75 |
| Texox ® PPG-2000 polyol[b] | — | 10 | 25 | — | — |
| Propylene oxide adduct of HEIMD prepared in Example 7 (6915-87) | — | — | — | 10 | 25 |
| Water | 4.0 | 4.0 | 4.0 | 4.0 | 4.0 |
| L-711 silicone[c] | 1.0 | 1.0 | 1.0 | 1.0 | 1.0 |
| 33% triethylene-diamine[d] | 0.3 | 0.3 | 0.3 | 0.3 | 0.3 |
| Catalyst T-10[e] | 0.4 | 0.4 | 0.4 | 0.4 | 0.4 |
| Toluene diisocyanate | 49.7 | 49.7 | 49.7 | 49.7 | 49.7 |
| NCO/OH | 1.05 | 1.05 | 1.05 | 1.05 | 1.05 |
| Details | | | | | |
| Cream Time, sec. | 10 | 10 | 10 | 10 | 10 |
| Rise Time, sec. | 115 | 113 | 109 | 103 | 109 |
| Cure Temp. °C. (hr) | 90–100 (1.0) | 90–100 (1.0) | 90–100 (1.0) | 90–100 (1.0) | 90–100 (1.0) |
| Properties[f] | | | | | |
| Density, pcf | 1.58 | 1.59 | 1.50 | 1.56 | 1.59 |
| Tensile, psi | 13.9 | 12.4 | 13.6 | 13.7 | 14.2 |
| Tear, pli | 2.19 | 2.07 | 2.67 | 2.43 | 2.7 |
| Elongation, % | 139 | 127 | 151 | 141 | 166 |
| Compression set % | | | | | |
| 50% | 8.8 | 7.0 | 9.9 | 8.7 | 10.6 |
| 75% | 8.0 | 6.6 | 7.2 | 8.4 | 11.9 |
| Humid aging (5 hr, 250° F., 100% RH) CLD | 18.8 | 20.9 | 21.1 | 16.3 | 18.2 |

TABLE 2-continued

| Composition, set % | 4.2 | 6.6 | 6.5 | 7.7 | 8.7 |
|---|---|---|---|---|---|

[a] 3000 m.w. propylene oxide/ethylene oxide adduct of glycerin, made by Eastman Chemical Co.
[b] 2000 m.w. polypropylene glycol made by Texaco Chemical Co.
[c] Silicone surfactant made by Union Carbide Chemical Co.
[d] Texacat TD-33, triethylenediamine made by Texaco Chemical Co.
[e] Stannous octoate catalyst.
[f] ASTM D 3574-81, "Flexible Cellular Materials-Slab, Bonded and Molded Urethane Foams."

What is claimed is:

1. A process for preparing a polyurethane foam which comprises foaming and reacting a mixture comprising an organic polyisocyanate, an admixture of (a) a polyether polyol and (b) about 5 to about 40 weight percent of a polyoxyalkylene glycol of the formula:

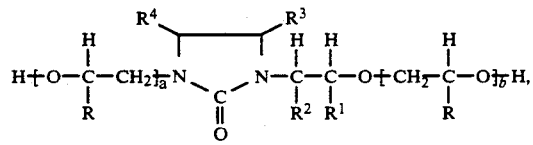

where R is H or an alkyl of 1 to 16 carbon atoms, $R^1$, $R^2$, $R^3$ and $R^4$ are selected from the group consisting of hydrogen and alkyl radicals having about from 1 to 4 carbon atoms and $a+b=n$, a number of from about 4 to about 80.

2. The process of claim 1 wherein in the said polyoxyalkylene glycol $R_3$ and $R_4$ are hydrogen.

3. The process of claim 1 wherein in the said polyoxyalkylene glycol R is hydrogen.

4. The process of claim 1 wherein in the said polyoxyalkylene glycol R is $CH_3$.

5. The process of claim 1 wherein in the said polyoxyalkylene glycol R is $CH_3$ and $R_1$, $R_2$, $R_3$ and $R_4$ are hydrogen.

6. The process of claim 1 wherein in the said polyoxyalkylene glycol R, $R_1$, $R_2$, $R_3$ and $R_4$ are hydrogen.

7. The process of claim 1 wherein in the said polyoxyalkylene glycol $a+b=n$, a number of from about 4 to 40.

8. The process of claim 1 wherein the said catalyst is stannous octoate, the said blowing agent is water, the said organic polyisocyanate is toluene diisocyanate, and in the said admixture the polyether polyol is a mixture of polyoxypropylene glycol and a propylene oxide/ethylene oxide adduct of glycerol and the polyoxyalkylene glycol is a propylene oxide/ethylene oxide adduct of 1-2'-hydroxyethyl-2-imidazolidone.

* * * * *